United States Patent Office
3,413,359
Patented Nov. 26, 1968

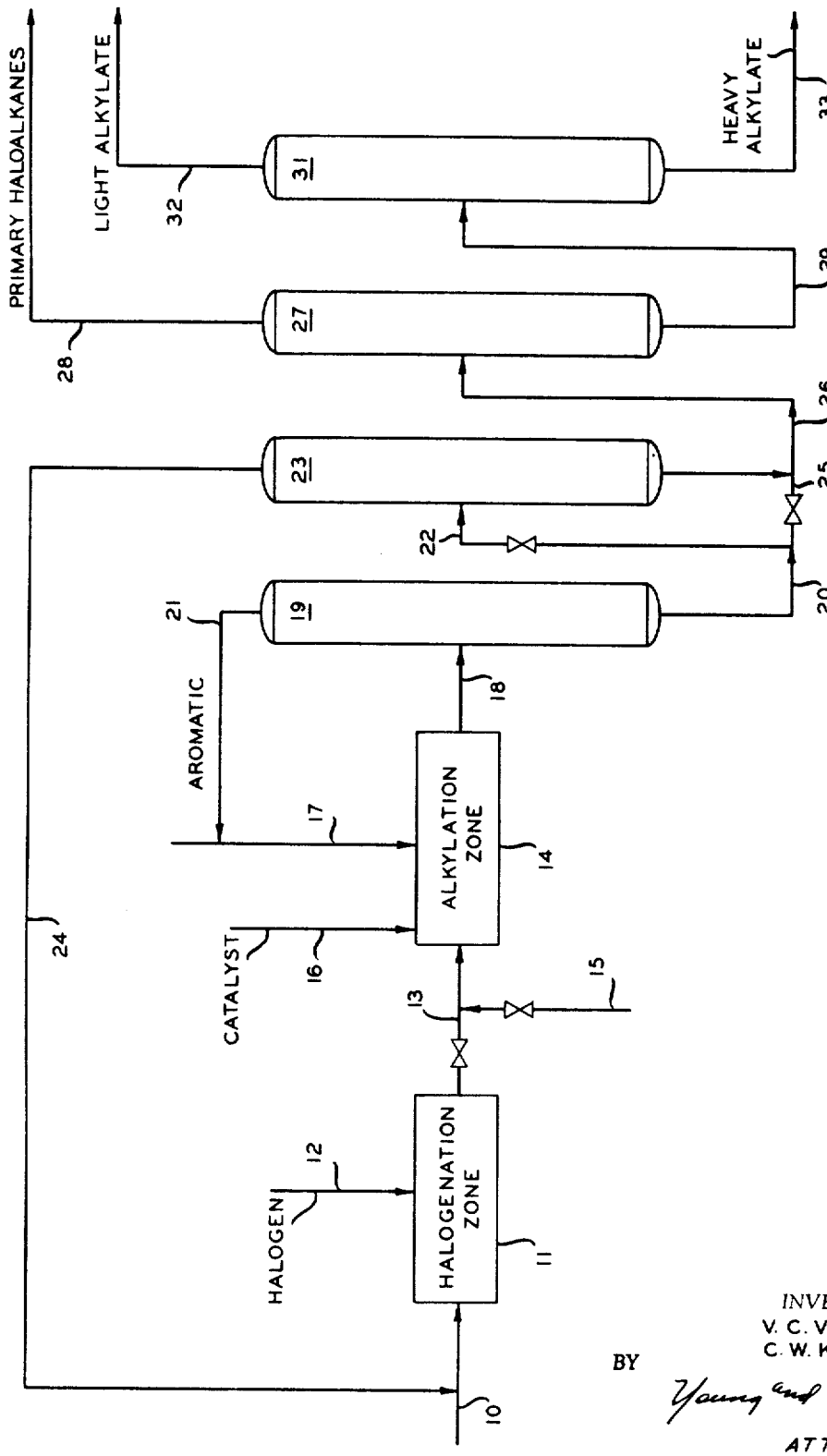

3,413,359
PRODUCTION AND/OR RECOVERY OF
PRIMARY HALOALKANES
Van C. Vives and Carl W. Kruse, Bartlesville, Okla., assignors to Phillips Petroleum Company, a corporation of Delaware
Filed Dec. 26, 1963, Ser. No. 333,433
7 Claims. (Cl. 260—652)

This invention relates to the production and/or recovery of primary haloalkanes. In one aspect this invention relates to the separation of primary haloalkanes from mixtures containing the same together with secondary and/or tertiary haloalkanes. In another aspect this invention relates to the production of detergent grade alkylate.

Haloalkanes, and particularly primary haloalkanes, are valuable starting materials for a number of other valuable materials such as alcohols, amines, and the like. Primary haloalkanes in high purity can be utilized to produce primary alcohols, primary amines, and the like of high purity and in high yield.

A wide variety of processes are available for the production of haloalkanes. Many of these processes involve the halogenation of paraffinic hydrocarbons in the presence or absence of ultraviolet light. Such processes yield mixtures of mono- and polyhalo compounds, with the monohalo compounds being a mixture of primary, secondary, and tertiary halides. If n-paraffins are employed as starting materials, no tertiary halides will be present in the yield mixture. However, because of the greater number of secondary carbon atoms present in the paraffinic hydrocarbons, the amount of secondary monohalides present in the yield mixture will, of course, be much greater than the amount of primary monohalides.

In the production of the chemicals, such as primary alcohols, primary amines, etc., from these halogenated paraffins, it would be advantageous if the secondary halides were not present. Thus if a method could be developed for separating said mixtures so as to obtain the primary halides in high purity, it would greatly facilitate the conversion of such halides to other valuable chemicals such as primary alcohols and the like in high purity. However, such separations are very difficult, particularly when a mixture of paraffinic hydrocarbons such as kerosene is subjected to halogenation. Such mixtures contain halogenated materials of such close boiling points that it is difficult, if not practically impossible, to separate the individual compounds by inexpensive methods such as distillation.

The present invention provides a solution for the above-described problems. Broadly speaking, according to the process of this invention, primary haloalkanes are separated from mixtures containing the same together with secondary and/or tertiary haloalkanes having essentially the same number of carbon atoms by contacting said mixtures with aromatic hydrocarbons in the presence of a catalyst which is selective for the alkylation of aromatic hydrocarbons with secondary and/or tertiary haloalkanes, said contacting being effected at conditions such that alkylation of the aromatic hydrocarbons with the secondary and/or tertiary haloalkanes occurs but alkylation of said aromatic hydrocarbons with the primary haloalkanes does not occur, separating the unconverted primary haloalkanes and alkylate, and recovering said primary haloalkanes.

Thus, an object of this invention is to provide a process for the production and/or recovery of primary haloalkanes. Another object of this invention is to provide a process for separating primary haloalkanes from mixtures containing the same and also containing secondary and/or tertiary haloalkanes having essentially the same number of carbon atom. Another object of this invention is to provide a process for the production of a detergent grade alkylate. Other aspects, objects, and advantages of the invention will be apparent to those skilled in the art in view of this disclosure.

Thus, according to the invention, there is provided a process for the separation of a primary haloalkane from a mixture containing same and other haloalkanes selected from the group consisting of secondary and tertiary haloalkanes containing substantially the same number of carbon atoms per molecule as said primary haloalkane, which process comprises: contacting an alkylatable aromatic hydrocarbon with said mixture, in the presence of an alkylation catalyst which is selective for the alkylation of aromatics with secondary and tertiary haloalkanes, under alkylation conditions at which alkylation of said aromatic hydrocarbon with said secondary and tertiary haloalkanes occurs, but at which conditions alkylation of said aromatic hydrocarbon with said primary haloalkane does not occur; and recovering said unreacted primary haloalkane from the resulting reaction mixture.

Haloalkanes which can be separated according to the process of this invention are the monochloroalkanes and monobromoalkanes containing from 3 to about 20 or more carbon atoms per molecule. While there is actually no upper limit on the number of carbon atoms in said haloalkanes, the haloalkanes containing more than 20 carbon atoms per molecule are not often utilized in the practice of the invention because of their higher boiling points. When it is desired to also produce a detergent grade alkylate, as discussed further hereinafter, the haloalkanes will preferably contain a more restricted range of carbon atoms per molecule, e.g., 10 to 15 or 13 to 15, depending upon the properties desired in the detergent. Examples of haloalkanes which can be utilized in the practice of the invention include, among others, the following: propyl chloride, pentyl chloride, octyl bromide, decyl chloride, pentadecyl chloride, eicosyl chloride, and the like. While no branched chain alkanes have been specifically mentioned above, it will be understood that they are included within the scope of the invention because in the practice of said invention the primary haloalkanes can be separated from secondary and/or tertiary haloalkanes.

The aromatic hydrocarbons which can be subjected to alkylation with the mixture of haloalkanes so as to provide a means for separating primary haloalkanes include, among others, such hydrocarbons as benzene, toluene, xylene, naphthalene, diphenyl, phenanthrene, anthracene, pyrene, chrysene, ethylbenzene, and the like. The preferred aromatic hydrocarbon for use in the practice of this invention is benzene. Relatively narrow boiling range mixtures of aromatic compounds, such as those recovered from various refining operations, can be utilized as the aromatic hydrocarbons if desired. However, essentially pure aromatic compounds are usually preferred.

Referring now to the drawing, the invention will be more fully explained. Said drawing is a schematic flow sheet illustrating various embodiments of the invention. It will be understood that many pumps, valves, condensers, etc. have been omitted as not being necessary to explain the invention to those skilled in the art and to simplify said drawing. In the process illustrated in said drawing, a suitable hydrocarbon mixture comprising predominantly normal paraffinic and isoparaffinic hydrocarbons of suitable boiling range, such as a $C_{13}$ to $C_{15}$ fraction, is introduced via conduit 10 into photochemical halogenation zone 11 wherein it is contacted in the presence of light with a halogenating agent introduced via conduit 12. Usually the hydrocarbon fraction introduced into halogenation zone 11 will preferably contain a high percentage of normal paraffinic hydrocarbons so as to eliminate the formation of tertiary haloalkanes. Such a fraction can be obtained by contacting kerosene with a suitable molecular sieve. However, it is within the scope of the invention to utilize mixtures of hydrocarbons which comprise predominantly branched chain paraffin hydrocarbons. If desired, the hydrocarbon introduced via conduit 10 can be a pure or essentially pure paraffinic hydrocarbon.

Chlorine and bromine are the preferred halogenating agents, with chlorine being the presently most preferred halogenating agent. Any suitable halogenation conditions can be employed in said halogenation zone but it is preferred to select conditions which provide about 20 percent conversion of the hydrocarbons to halogenated hydrocarbons per pass. Said conditions will include a temperature within the range of from 0 to 100° F., preferably 20 to 50° F., a pressure within the range of from 20 to 100 p.s.i., preferably 30 to 50 p.s.i., and a reaction time within the range of 8 to 20 seconds. It will be understood that said conditions are interrelated and variation in one condition will be accompanied by variation in one or more of the other conditions. For example, when using the preferred halogenating agent (chlorine), pressure is employed to maintain the hydrocarbon in liquid phase (if necessary) and also to increase the solubility of gaseous chlorine in said hydrocarbons. The amount of pressure actually employed will depend upon the hydrocarbons present, the temperature, and the desired conversion level. With respect to temperature, higher temperatures favor the formation of dichlorides which is undesirable. Higher conversion rates also favor the formation of dichlorides. It is preferred to select conditions such that the ratio of monochlorides to dichlorides is within the range of from 4:1 to 30:1, preferably 7:1 to 12:1, more preferably about 9:1. The chlorination reaction is a photochemical reaction and is carried out by dissolving the chlorine, in the hydrocarbon and then exposing the resulting mixture or solution to ultraviolet light under time, temperature, and pressure conditions within the ranges set forth above.

It is to be understood that the invention is not limited to employing photochemical halogenation in the halogenation step. Haloalkanes prepared by any other suitable halogenation method such as thermal and catalytic methods can be employed in the practice of the invention. Halogenating agents in addition to those mentioned above which can be employed include sulfuryl chloride, sulfuryl bromide, thionyl chloride, and thionyl bromide. Halogenation catalyst which can be employed include ferric chloride, antimony chloride, sulfur chloride, iodoform, benzoyl peroxide and others. It should also be understood that it is within the scope of the invention to introduce pure or substantially pure halohydrocarbons from any source into system via conduit 15, instead of or in addition to the halohydrocarbons from conduit 13.

A mixture of halogenated and nonhalogenated hydrocarbons is withdrawn from halogenation zone 11 via conduit 13 and introduced into alkylation zone 14. A suitable alkylation catalyst which will selectively alkylate aromatic compounds with secondary and/or tertiary haloalkanes is introduced into alkylation zone 14 via conduit 16. An example of a suitable catalyst is hydrogen fluoride, preferably anhydrous or essentially anhydrous hydrogen fluoride. However, said hydrogen fluoride can contain up to about 5 percent water by volume. A suitable alkylatable hydrocarbon, selected from those named above, is introduced into zone 14 via conduit 17.

The conditions employed in alkylation zone 14 will depend somewhat upon the catalyst employed, the aromatic hydrocarbon to be alkylated, and the boiling points of the haloalkanes. As will be understood by those skilled in the art, said conditions are somewhat interrelated. When employing the abovedescribed hydrogen fluoride catalysts, the alkylation will generally be carried out at a temperature within the range of from 0 to 125, preferably from about 25 to about 100° C. The pressure in said alkylation zone is not critical, will usually be autogenous and sufficient to maintain liquid phase conditions, and will generally be less than 500 p.s.i. When operating in a continuous system, flow rates of reactants should be maintained such that the residence or contact time in the contactor or reaction zone is within the range of from about 10 minutes to about 30 minutes, preferably from about 10 to about 20 minutes. When operating in a batch process said residence or contact time can be within the range of from about 10 minutes to 50 hours, depending upon the temperature.

The ratio of the total reactants fed to the reactor or alkylation zone, i.e., the sum of the aromatic hydrocarbon plus the mixture of haloalkanes, to the hydrogen fluoride catalyst will usually be within the range of from about 0.5:1 to 5:1, on a volume basis. The mol ratio of the aromatic hydrocarbon to the haloalkanes entering the alkylation zone should be such as to furnish at least one mol of benzene per gram atom of halogen on the haloalkanes. It is preferred to operate with an excess of aromatic hydrocarbon. Thus, the mol ratio of the aromatic hydrocarbon to the haloalkanes can vary over a wide range but will generally be within the range of from about 1.5:1 to 25:1, preferably from 5:1 to 20:1. At any given set of conditions in the reactor the reaction rate of the secondary haloalkanes with the aromatic hydrocarbon will be greater than the reaction rate of the primary haloalkanes with said aromatic hydrocarbon. Thus, in addition to effecting the primary or main control of the amount of primary haloalkane which reacts with the aromatic hydrocarbon by means of temperature, one can also control the reaction by controlling the residence time of the haloalkanes in the reactor, particularly when operating at the upper end of the above-described temperature range.

Alkylation zone 14 includes, in addition to a suitable contactor or reactor for carrying out the alkylation reaction, a separation zone wherein a hydrocarbon phase is separated from the catalyst phase. Said hydrocarbon phase is withdrawn from zone 14 via conduit 18 and introduced into fractionator 19 from which an overhead stream comprising unreacted aromatic hydrocarbon is withdrawn via conduit 21 and recycled to said alkylation zone 14 via conduit 17. A bottoms fraction comprising nonhalogenated alkanes, unreacted primary haloalkanes, and alkylate is withdrawn from fractionator 19 via conduit 20 and introduced via conduit 22 into fractionator 23. An overhead fraction comprising nonhalogenated alkanes is withdrawn from said fractionator 23 via conduit 24 and recycled to halogenation zone 11 via conduit 10. A bottoms fraction comprising unreacted primary haloalkanes and alkylate is withdrawn from said fractionator 23 via conduit 26 and introduced into fractionator 27. In the event the system is charged with substantially pure halohydrocarbons from conduit 15, instead of the mixture from conduit 13, then there will be little, if any, nonhalogenated hydrocarbons in the bottoms from fractionator 19. In such event the bottoms stream in conduit 20 is passed via conduit 25 into conduit 26 for introduction into fractionator 27. An overhead fraction comprising essentially pure unreacted primary haloalkanes is withdrawn from fractionator 27 via conduit 28 as one product of the process. A bottoms fraction comprising alkylate, i.e., aromatic hydrocarbon which has been alkylated with the secondary and/or tertiary haloalkanes is withdrawn from fractionator 27 via conduit 29 and introduced into fractionator 31 wherein it is fractionated into a light alkylate stream withdrawn via conduit 32 and a heavy alkylate stream withdrawn via conduit 33.

Said light alkylate withdrawn via conduit 32 is a valuable material which can be sulfonated in known manner for the production of valuable detergents. Thus, the process of the invention not only produces valuable primary haloalkanes as one product of the process but also produces an alkylate which is a valuable raw material for the production of valuable detergents.

The following examples will serve to further illustrate the invention.

Example I

A series of runs was carried out in which benzene was alkylated with chloroalkanes.

In each of these runs, a one-gallon autoclave, equipped with a 570 r.p.m. stirrer, was charged with benzene, haloalkane, and anhydrous hydrogen fluoride catalyst. The mol ratio of benzene to haloalkane was 10:1. The volume ratio of benzene plus haloalkane to hydrogen fluoride was 2:1. The hydrogen fluoride was charged first by pressuring same into said autoclave with nitrogen. A mixture of benzene and haloalkanes in the desired ratio of 10:1 was prepared and pressured into the autoclave with nitrogen in an amount to give the above desired ratio of benzene plus haloalkane to hydrogen fluoride. The excess nitrogen was then vented, and the mixture of HF, benzene and haloalkanes was stirred while heating to the desired reaction temperature. Samples were taken periodically for gas-liquid chromatography by means of a dip stick tube located at a level which allowed sampling of the top hydrocarbon layer after the phases had separated upon temporary cessation of stirring. In those runs wherein an additive or promoter was used it was pressured into the autoclave after the other materials had been charged.

At the end of each run the reactor was emptied by means of a dip tube extending to the bottom of the reactor. In each run, the HF phase was neutralized with ammonium hydroxide, or it was permitted to evaporate. The analysis of the alkylate phase was carried out by distillation, gas-liquid chromatography and chlorine analysis for Runs 1, 2, and 3 of Table I. Gas-liquid chromatography alone was used in the remainder of the runs.

In Runs 1, 2, and 3 of Table I, a chloroalkane mixture previously prepared by the chlorination of a $C_{13}$ to $C_{15}$ paraffin fraction was used. This mixture of paraffins and chlorinated paraffins contained approximately 10 weight percent chlorinated paraffins. Of said chlorinated paraffins, approximately 10 weight percent were primary chlorinated alkanes with the remainder being secondary and tertiary haloalkanes. The remainder of the runs in Table I were carried out using the primary haloalkane, 1-chlorododecane.

The gas-liquid chromatography system used for analysis was a 10-foot silicone column operating at 175° C. and 30 p.s.i. helium pressure on a Model 154 Perkin-Elmer Vapor Fractometer. The results of these runs are shown below in Table I.

The results of Runs 1, 2, and 3 in the above Table I show that from 83.5 to 90.3 percent of the haloalkanes present in the feed mixture reacted with the benzene to form alkylate. Analyses by gas-liquid chromatography showed the remaining unreacted haloalkanes to be essentially the three primary $C_{13}$, $C_{14}$, and $C_{15}$ haloalkanes. The results of Runs 4–11 show that when the haloalkane is a primary haloalkane, less than two percent of the haloalkane reacts with the benzene to form alkylate, even in the presence of the various promoters used. These results show that the primary haloalkanes did not react with aromatic compounds to form alkylate whereas the secondary and tertiary halokalkanes did.

Example II

Another run is carried out according to the process of this invention wherein benzene is alkylated with chlorinated paraffins in the presence of anhydrous HF to prepare a detergent grade alkylate and primary chloroparaffins.

In this run, a n-paraffin concentrate having the following composition is utilized:

PARAFFIN ANALYSIS

Wt. percent
- 1.7 _____ Lighter than $C_{13}$.
- 27.0 _____ n-$C_{13}$.
- 47.0 _____ n-$C_{14}$.
- 24.0 _____ n-$C_{15}$.
- 0.3 _____ Non-normal paraffins.
- Average molecular weight __ 197.

This n-paraffin concentrate is chlorinated to form a chlorinated paraffin-paraffin mixture containing approximately 20 mol percent monochloroparaffins. Of the chlorinated paraffin present approximately 12–15 mol percent comprises primary monochloroparaffins.

Benzene is then alkylated with the secondary chloroparaffins by charging 450 grams benzene, 1000 grams anhydrous HF, and 1150 grams of the above-described chlorinated paraffin-paraffin mixture to a stainless steel reactor and heating to 80° C. for 2 hours at autogenous pressure. The HF and hydrocarbon phases are then separated after cooling the mixture. The hydrocarbon phase is found to analyze 0.2 weight percent chlorine. The unreacted benzene, unreacted chloroparaffins, paraffins, and alkylate are then separated by distillation. It is found that essentially all of the primary monochloroparaffins have passed through the alkylation zone without reacting and essentially all of the secondary chloroparaffins alkylated with benzene.

While the invention has been described above with particular reference to preparing the feed stocks utilized in the process of the invention by distillation methods, it is within the scope of the invention to employ other methods, e.g., solvent extraction, for preparing said feed stocks. Also, combinations of various methods can also be employed for preparing said feed stocks. For example, while the kerosene fraction from some crude oils such as some Michigan crude oils and some Pennsylvania crude oils contain very little, if any, aromatic compounds, it may be desirable or necessary to solvent extract the kerosene fraction from other crude oils to remove the aromatics therefrom before or after distillation of the kerosene. Thus, it is within the scope of the invention to employ any suitable method known to the art for preparing the feed stocks introduced into alkylation zone 14 via conduit 13.

While certain embodiments of the invention have been

TABLE I

| Run No. | Temp., ° C | Reaction time, hours | Feed | Promoter or additive, wt. percent | Percent conversion |
|---|---|---|---|---|---|
| 1 | 24–81 | 4 | Mixed chlorides [1] | 0 | 83.5 |
| 2 | 30–85 | 1 | do | 0 | 85.9 |
|   | 90–106 | 2 |   |   |   |
| 3 | 135–47 | 1 | do | 0 | 90.3 |
| 4 | 80 | 0.75 | 1-chlorododecane | 0.5–4.0 $H_2O$ [2] | <2 |
| 5 | 80 | 1 | do | 0.5 $SbCl_3$ | <2 |
| 6 | 82 | 1 | do | 0.6 $SbCl_5$ | <2 |
| 7 | 80 | 1 | do | 0.6 $SnCl_4$ | <2 |
| 8 | 80 | 1 | do | 0.9 HI | <2 |
| 9 | 80 | 1 | do | 0.4 $I_2$ | <2 |
| 10 | 80 | 1 | do | 1.8 $KF \cdot 2H_2O$ | <2 |
| 11 | 80 | 1 | do | 0.3 $FeCl_3$ | <2 |

[1] Mixed chlorides from chlorination of $C_{13}$ to $C_{15}$ paraffins.
[2] Run No. 4 consisted of four runs with a reaction time of about 0.75 hrs. at each of the water concentrations 0.5; 1.0; 2.0; and 4.0%, respectively.

described for illustrative purposes, the invention obviously is not limted thereto. Various other modifications will be apparent to those skilled in the art in view of this disclosure. Such modifications are within the spirit and scope of the invention.

We claim:

1. A process for the separation of a primary monohaloalkane containing from 3 to 20 carbon atoms per molecule from a mixture containing same and other haloalkanes selected from the group consisting of secondary and tertiary haloalkanes containing substantially the same number of carbon atoms per molecule as said primary monohaloalkane; which process comprises, in combination, the steps of: contacting an alkylatable aromatic hydrocarbon selected from the group consisting of benzene, toluene, xylene, naphthalene, diphenyl, phenanthrene, anthracene, pyrene, chrysene, and ethylbenzene with said mixture in an alkylation zone, in the presence of substantially anhydrous hydrogen fluoride as an alkylation catalyst, under sufficient pressure to maintain said aromatic hydrocarbon, said haloalkanes, and said catalyst in liquid phase, and at a temperature within the range of from 0 to 125° C. and recovering unreacted primary monohaloalkane from the resulting reaction mixture; the halogen in said haloalkanes being selected from the group consisting of chlorine and bromine.

2. A process according to claim 1 wherein said aromatic hydrocarbon is benzene.

3. A process according to claim 1 wherein said aromatic hydrocarbon is benzene and the halogen in said haloalkanes is chlorine.

4. A process for the production of a primary monohaloalkane containing from 10 to 15 carbon atoms per molecule and a detergent grade alkylate, which process comprises, in combination, the steps of: contacting an alkylatable aromatic hydrocarbon selected from the group consisting of benzene, toluene, xylene, naphthalene, diphenyl, phenanthrene, anthracene, pyrene, chrysene, and ethylbenzene with a mixture containing said primary haloalkane along with other haloalkanes selected from the group consisting of secondary and tertiary haloalkanes containing substantially the same number of carbon atoms as said primary monohaloalkane in an alkylation zone, in the presence of substantially anhydrous hydrogen fluoride as an alkylation catalyst, under sufficient pressure to maintain said aromatic hydrocarbon, said haloalkanes, and said catalyst in liquid phase, and at a temperature within the range of from 0 to 125° C. recovering unreacted primary monohaloalkane from the resulting reaction mixture; and recovering said detergent grade alkylate from said reaction mixture; the halogen in said haloalkanes being selected from the group consisting of chlorine and bromine.

5. A process according to claim 4 wherein said aromatic hydrocarbon is benzene and the halogen in said haloalkanes is chlorine.

6. A process for the production of primary monohaloalkanes containing from 10 to 15 carbon atoms per molecule and a detergent grade alkylate, which process comprises, in combination, the steps of: halogenating a feed stream comprising paraffin hydrocarbons containing from 10 to 15 carbon atoms per molecule in a halogenation zone under halogenation conditions with a halogen selected from the group consisting of chlorine and bromine to produce a mixture of monohalogenated hydrocarbons, primary monohaloalkanes, and other haloalkanes selected from the group consisting of secondary haloalkanes and tertiary haloalkanes; contacting an alkylatable aromatic hydrocarbon selected from the group consisting of benzene, toluene, xylene, naphthalene, diphenyl, phenanthrene, anthracene, pyrene, chrysene, and ethylbenzene with said mixture in an alkylation zone, in the presence of substantially anhydrous hydrogen fluoride as an alkylation catalyst, under sufficient pressure to maintain liquid phase conditions, and at a temperature within the range of from 0 to 125° C. to form a hydrocarbon phase comprising unreacted aromatic hydrocarbon, nonhalogenated paraffinic hydrocarbons, unreacted primary monohaloalkanes, and alkylate; fractionating said hydrocarbon phase to recover therefrom a stream comprising said unreacted aromatic hydrocarbon, a stream comprising said nonhalogenated paraffinic hydrocarbons, a stream comprising said unreacted primary monohaloalkanes, and a stream comprising detergent grade alkylate; recycling said stream of nonhalogenated paraffinic hydrocarbons to said halogenation zone; and recycling said unreacted aromatic hydrocarbon to said alkylation zone.

7. A process according to claim 6 wherein said aromatic hydrocarbon is benzene and said halogen is chlorine.

References Cited

UNITED STATES PATENTS

| | | | |
|---|---|---|---|
| 2,455,003 | 11/1948 | Frey | 260—671 XR |
| 2,511,818 | 6/1950 | Spina | 260—652 |
| 2,548,764 | 4/1951 | Ayers et al. | 260—659 |
| 2,233,408 | 3/1941 | Flett | 260—671 XR |
| 2,340,654 | 2/1944 | Flett | 260—671 XR |

FOREIGN PATENTS 416,379  9/1934  Great Britain.

OTHER REFERENCES

Simons, Ind. and Eng. Chem., vol. 32, No. 2 (1940), pp. 178–183.

Olah, Friedel-Crafts and Related Reactions, Interscience, New York, vol. 1, pp. 40–43, 1963.

LEON ZITVER, *Primary Examiner.*

H. MARS, *Assistant Examiner.*